Figure 1:
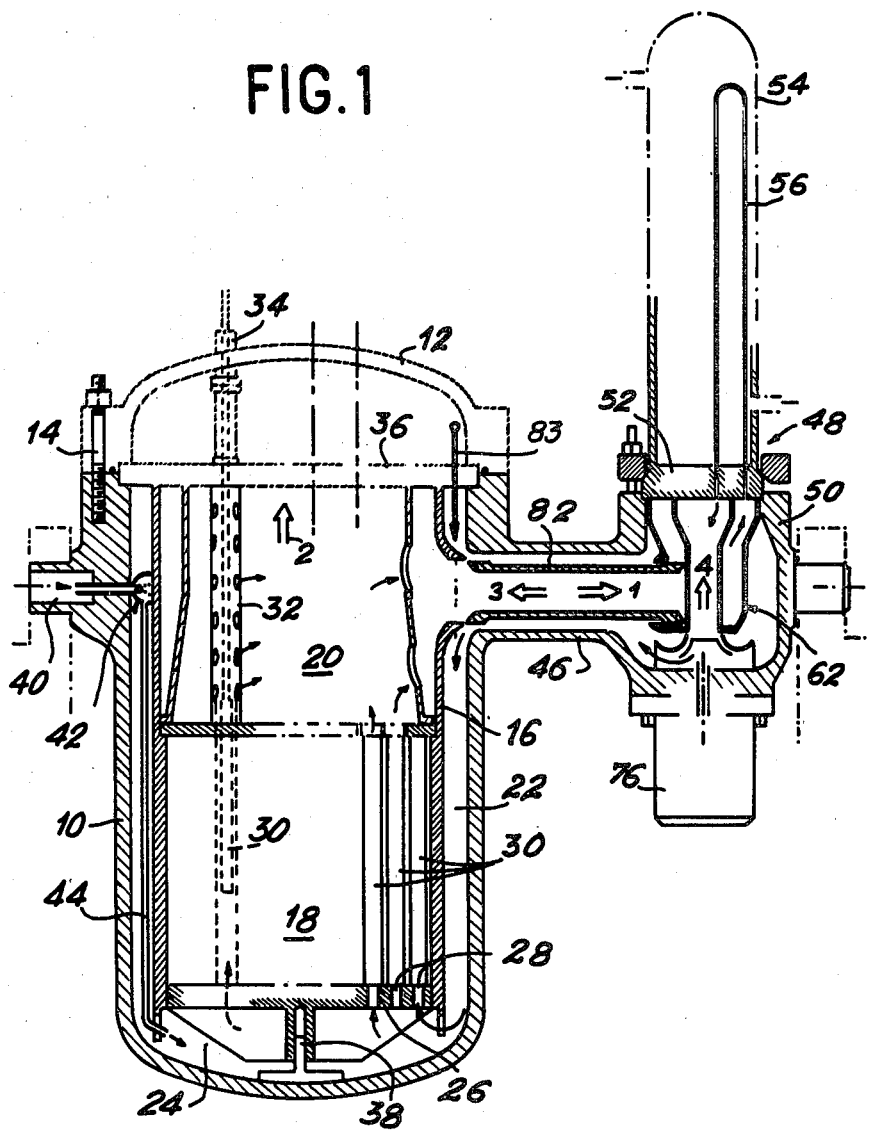

United States Patent [19]

Aubert

[11] 4,380,084
[45] Apr. 12, 1983

[54] NUCLEAR BOILER WITH DISMOUNTABLE WATER BOX

[75] Inventor: Gilles Aubert, Orsay, France

[73] Assignee: Commissariat a l'Energie Atomique, Paris, France

[21] Appl. No.: 171,412

[22] Filed: Jul. 23, 1980

[30] Foreign Application Priority Data

Jul. 24, 1979 [FR] France ................................ 79 19053

[51] Int. Cl.³ ........................................... G21C 13/00
[52] U.S. Cl. .................................... 376/204; 376/286;
376/292; 376/393; 376/405
[58] Field of Search ............... 376/204, 286, 292, 352, 376/392, 393, 404, 405

[56] References Cited

U.S. PATENT DOCUMENTS

| 3,119,746 | 1/1964 | Lemesle et al. | 376/286 |
| 3,937,653 | 2/1976 | Leheu | 376/404 X |
| 4,219,385 | 8/1980 | Guidez et al. | 376/404 X |
| 4,235,672 | 11/1980 | Harand et al. | 376/292 X |
| 4,238,291 | 12/1980 | Neuenfeldt et al. | 376/292 X |
| 4,259,156 | 3/1981 | Neuenfeldt et al. | 376/286 |
| 4,285,770 | 8/1981 | Chi et al. | 376/203 X |

*Primary Examiner*—Peter A. Nelson

[57] ABSTRACT

The present invention relates to a nuclear boiler comprising a vessel whose top is closed by a dismountable cover, a cage bearing the core of the reactor and separating the vessel into an inner hot zone and an outer cold zone, at least one steam generator disposed outside the vessel and comprising a tight enclosure, a tube plate, separating the enclosure into a primary part, or water box, and a secondary part, and bearing U-shaped tubes whose ends open into two concentric zones of the water box separated by an internal structure, at least one hot connecting pipe and one cold connecting pipe respectively connecting the hot zone and the cold zone of the vessel to each of the concentric zones of the water box, wherein the tube plate, the tubes and the secondary part of the enclosure of the steam generator define a subassembly dismountable from the primary part of the enclosure, the hot connecting pipe being dismountably mounted between the cage and the internal structure of the water box, this strucutre itself being dismountably mounted in the primary part of the enclosure.

8 Claims, 3 Drawing Figures

NUCLEAR BOILER WITH DISMOUNTABLE WATER BOX

The present invention relates to a nuclear boiler comprising an ordinary pressurised water reactor.

The invention relates more particularly to a nuclear boiler of the type comprising a vessel, whose top is closed by a dismountable cover, a cage carrying the core of the reactor and separating the vessel into an inner hot zone and an outer cold zone, at least one steam generator disposed outside the vessel and comprising a tight enclosure, a tube plate separating the enclosure into a primary part, or water box, and a secondary part, and bearing U-shaped tubes whose ends open into two concentric zones of the water box separated by an internal structure, at least one hot connecting pipe and one cold connecting pipe respectively connecting the hot zone and the cold zone of the vessel to each of the concentric zones of the water box.

In nuclear boilers of this type, it is desirable to have access to the internal walls of the pressurised enclosure of the primary circuit, so as to be able to carry out the inspections during service provided by regulations. It is also desirable to be able easily to replace the different members disposed inside the enclosure and the steam generators and to be able to inspect or repair these members, preferably at an outside work station enabling these different operations to be carried out under good material conditions and with a minimum of irradiation.

It is therefore an object of the invention to provide a nuclear boiler in which the inspection during service, repair and possible change of the internal members, particularly the bundle of tubes, the internal structure of the water box and the pressurised envelope thereof, are facilitated.

To this end and in accordance with the invention, a nuclear boiler of the type defined hereinabove is characterised in that the tube plate, the tubes and the secondary part of the enclosure of the steam generator define a sub-assembly dismountable from the primary part of the enclosure (water box), the hot connecting pipe being dismountably mounted between the cage and the internal structure of the water box, this structure itself being dismountably mounted in the primary part of the enclosure.

Due to this particular structure, the secondary part of the steam generator, the internal structure of the water box and the hot connecting pipe may be dismantled, this enabling them to be inspected, repaired or replaced, and facilitating inspection during service of the internal walls of the pressurised enclosure of the primary circuit.

According to a preferred embodiment of the invention, the hot connecting pipe is rectilinear and of length shorter than the inner diameter of the vessel, so as to be able to be extracted through the latter after dismantling of the cover and removal of the core cage. The hot connecting pipe may then be hermetically fixed to the cage by dismountable fixing means and received by tight slide in an aperture formed in the internal structure of the water box, this making it possible to compensate the differential expansion which may be produced between these different members. The dismountable fixing means may then comprise a key disposed transversely with respect to the hot connecting pipe and normally immobilised by the cover of the vessel.

According to another feature of the invention, the primary and secondary parts of the enclosure of the steam generator bear flanges between which are disposed dismountable tightening means. The internal structure of the water box preferably comprises, in this case, a flange gripped between the primary and secondary parts of the enclosure under the action of the dismountable tightening means. According to a particular embodiment of the invention, the internal structure of the water box then comprises two concentric bowls connected by fins and defining concentric zones of the water box, and the flange gripped between the primary and secondary parts of the closed enclosure is fast with the outer bowl.

According to a further feature of the invention, a pump is fixed on the primary part of the enclosure, means being provided between the pump and the internal structure of the water box to urge the flange towards the tube plate.

Figure 2:
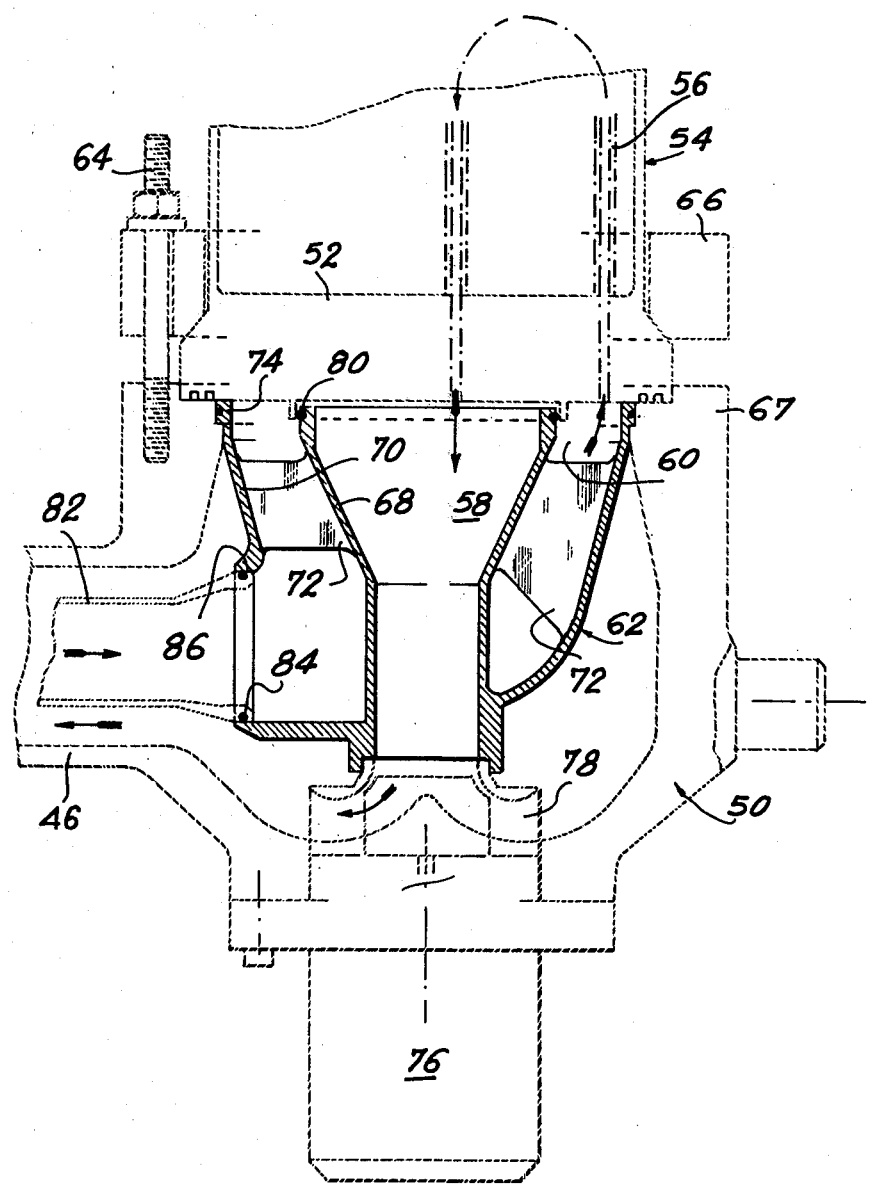
Figure 3:
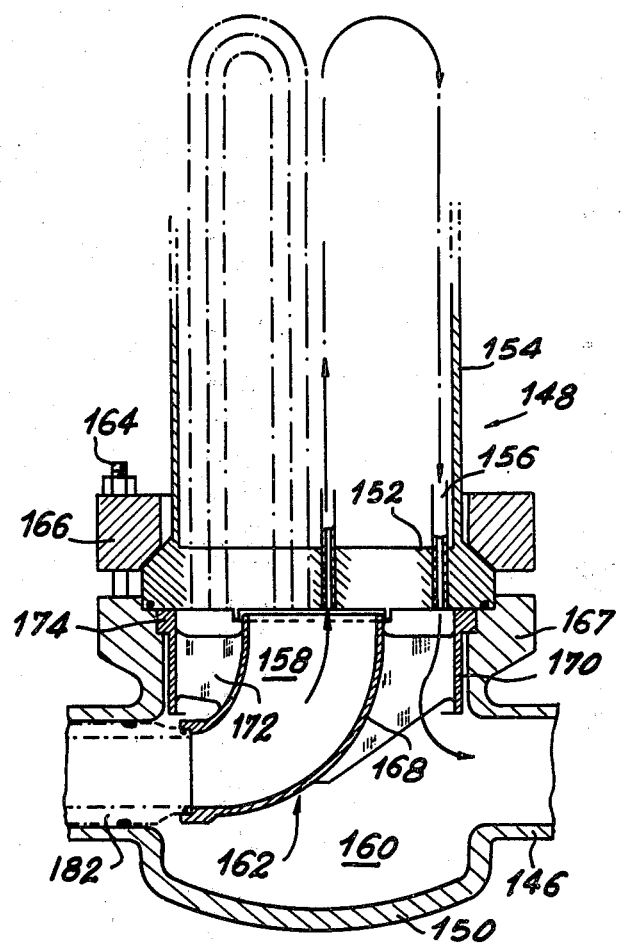

The invention will be more readily understood on reading the following description with reference to the accompanying drawings, in which:

FIG. 1 is a view in section of the boiler of a pressurised water reactor of which the vessel communicates with an assembly comprising a steam generator and its pump, FIG. 2 is an enlarged view in section of the lower part of the steam generator shown in FIG. 1, and FIG. 3 is an enlarged view in section of the lower part of a steam generator illustrating another embodiment of a nuclear boiler according to the invention.

Referring now to the drawings, the nuclear boiler shown in FIG. 1 comprises a vessel 10 whose top is closed by a cover 12 fixed to the vessel 10 by pins 14. The vessel 10 is cylindrical, of vertical axis, and contains a cage 16 bearing the core 18 of the reactor. The cage 16 thus separates the vessel 10 into an inner hot zone 20, which is substantially cylindrical, and an outer cold zone 22, forming an annular space. a passage 24 is defined between the lower end of the cage 16 and the bottom of the vessel 10, this enabling the fluid of the cold zone to penetrate in the apertures 28 of the grid 26.

The cage 16 is borne by a plate 36 tightened between the cover 12 and the vessel 10, and centred with respect to the latter by means of a piece 38.

The cage 16 supports the core 18 by means of a grid 26 pierced with passages 28 through which the cold primary fluid contained in the outer zone 22 is admitted inside fuel elements 30 contained in the core 18. Each of the fuel elements 30 is surmounted by a guide tube 32 borne by the plate 36 and in which slides a control rod whose rod 34 passes through the cover 12.

One or more radial apertures 40 are made in the wall of the vessel 10, so as to allow the injection into the low part thereof, via a non-return valve 42 and a pipe 44, of an emergency coolant liquid in the case of the circulation of the primary liquid in the vessel 10 being accidentally interrupted.

Radial pipes 46 also connect the vessel 10 to the primary part, or water box 50, of steam generators 48 each comprising a tube plate 52 separating the water box 50 from a secondary part 54 of the steam generator. The tube plate 52 bears U-shaped tubes 56 whose ends open into two concentric zones 58 and 60 of the water chamber 50 separated by an internal structure 62.

According to the invention, and as illustrated in FIGS. 1 and 2, the tube plate 52, the tubes 56 and the secondary part 54 of the enclosure of the steam generator 48 define a sub-assembly dismountably fixed to the primary part 50 of the steam generator by means of pins 64 screwed in a flange 67 formed in the enclosure of the water box 50 and acting via a flange 66 on the tube plate 52.

As illustrated in particular in FIG. 2, the internal structure 62 of the water box 50 comprises two concentric bowls 68 and 70 connected by fins 72. The outer bowl 70 comprises a flange 74 gripped between the tube plate 52 and the enclosure of the water box 50 under the action of the pins 64 and the inner bowl 68 comprises an upper, cylindrical part which bears an O-ring 80 engaging an annular projection on the tube plate 52. Thus, the outer zone 60 is defined between the bowls 68 and 70, whilst the inner zone 58 is formed inside the bowl 68.

In the embodiment shown, there is associated with each steam generator 48 a pump 76 disposed substantially in axial extension of the generator and preferably bearing a guide system 78 allowing the passage of the primary liquid contained in the inner zone 58 towards the vessel 10 and urging the internal structure 62 towards the tube plate 52, in order in particular to ensure the tightness between the zones 58 and 60 of the water box 50 defined by the internal structure 62.

As illustrated in particular in FIG. 1, a second pipe 82 is disposed inside the pipe 46, so as to place the outer annular zone 60 of the water box 62 in communication with the inner zone 20 of the vessel 10, and to define with the pipe 46 an annular passage placing the inner zone 58 of the water box 62 in communication with the outer zone 22 of the vessel 10 via the pump 78.

As illustrated in FIG. 1, the pipe 82 is dismountably disposed between the internal structure 62 of the water box and the cage 16. More precisely, the connecting pipe 82 is hermetically fixed to the cage 16, for example by means of a key disposed transversely with respect to the pipe and normally immobilised by the cover 12 of the vessel as schematically illustrated by reference 83 of FIG. 1. The other end of the connecting pipe 82 is received with tight slide in an aperture 86 formed in the outer bowl 70 of the structure 62. As shown in particular in FIG. 2, the tightness between the connecting pipe 82 and the outer bowl 70 is effected by means of an O-ring 84. Finally, and in order to enable the pipe 82 to be dismantled through the vessel 10 in the direction of arrow (3) of FIG. 1, the pipe 82 is rectilinear and its length is shorter than the inner diameter of the vessel.

The functioning of the nuclear boiler described with reference to FIGS. 1 and 2 is identical to the functioning of known nuclear boilers of this type and will not be described here in detail. It will simply be noted that, in the embodiment described, the primary liquid contained in the vessel 10, in the pipes 46 and in the water box 50 of the steam generators 48 circulates in the direction of the arrows in FIG. 1. Thus, the hot liquid contained in zone 20 of the vessel 10 is conveyed inside the inner pipes 82 towards the outer annular zone 60 of each of the water boxes 50. The primary liquid then circulates in each of the U-tubes 56 of the steam generators 48 so as to vaporise the secondary liquid contained in the upper part 54 of these generators. The cooled liquid which leaves the U-tubes 56 to penetrate in the inner zone 58 of the water box 50 is then conveyed under the impulsion of the pump 78 through the annular space defined between the pipes 46 and 82 in the outer zone 22 of the vessel 10, then recycled in the core 18 of the reactor in which it penetrates through the passage 24 and the grid 26.

According to the invention and as illustrated in particular to FIG. 1, the nuclear boiler which has just been described may easily be dismantled so as to enable the walls of the pressurised enclosure of the primary circuit to be inspected during service, as provided by the regulations, whilst facilitating repair and possible replacement of the internal members of the boiler, and particularly the bundle of tubes 56 of the steam generators, the internal structres 62 of the water box 50 and the pressurised enclosure thereof.

Thus, in the embodiment shown, the internal structures of the boiler are dismantled, after the cover 12 then the key 83 have been removed, by sliding the pipe 82 in the direction of arrow 1, so as to disengage the pipe from the opening formed in the cage 16, so that the latter may be extracted from the vessel 10 as shown by arrow 2. The inner pipe 82 may then be dismantled through the vessel 10 by sliding it in the direction of arrow 3. After the pins 64 have been dismantled, the upper or secondary part 54 of the steam generator 48 may also be dismantled, so that the internal structure 62 of the water box 50 is disengaged and may easily be extracted as indicated by arrow 4 in FIG. 1. The internal walls of the vessel 10, the pipes 46 and the enclosure of the water boxes 50 may thus be easily inspected and the internal structures may be transported to a well equipped working station enabling all inspection or repair works of these structures to be carried out under good material conditions and with the minimum of irradiation. All the dismantling operations which have just been described, as well as the corresponding assembly operations, are carried out by means of special remote-controlled handling machines.

Of course, the invention is not limited to the particular structure of the nuclear boiler which has just been described, but covers all the variants thereof. Thus, the connecting pipes 82 may place the inner hot zone 20 of the vessel 10 in communication either with the outer zone 60 of the water box 50 as shown in FIGS. 1 and 2, or with the inner zone 58, so that the circulation of the primary liquid inside the steam generator 48 is effected in the direction opposite that shown in FIG. 1. Similarly, the hot and cold connecting pipes 82 and 46 respectively which connect the vessel 10 to each of the steam generators 48 may be disposed in the same pressurised envelope as illustrated in the embodiment shown in FIGS. 1 and 2, or in two different envelopes so as to define loops in which each steam generator comprises a distinct input and output.

An example of the two variant embodiments which have just been evoked is shown in FIG. 3 which shows the lower part of a steam generator 148 comprising a primary part, or water box 150 and a secondary part 154. In this variant embodiment of the invention, the hot connecting pipe 182 and the cold connecting pipe 146 which connect the water box 150 to the vessel of the nuclear boiler open in the water box via two opposite openings, and the hot connecting pipe 182 opens in the inner zone 158 of the internal structure 162 of the water box 150, whilst the cold connecting pipe 146 opens directly into the outer zone 160 defined by the internal structure 162. In this case, and as illustrated in FIG. 3, the sole function of the outer bowl 170 of the structure 162 is to allow the dismountable fixation of the structure 162 by means of a flange 174 gripped between the tube plate 152 and the flange 167 formed on the enclosure of the water box 150 under the action of the pins 164 acting on the tube plate 152 via the flange 166. As in the preceding embodiment, the outer bowl 170 is connected to the inner bowl 168 by pins 172. The circulation of the primary fluid in the steam generator 148 is then effected in the direction of the arrows in FIG. 3, i.e. from the inner zone 158 towards the outer zone 160.

As in the preceding embodiment and in accordance with the invention, the sub-assembly constituted by the tube plate 152, by the tubes 156 and by the secondary part 154 of the enclosure of the steam generator may be dismantled by means of the pins 164. The internal structure 162 of the water box 150 may then be dismantled after dismantling of the hot connecting pipes 182 in the manner described with reference to the first embodiment of the invention.

I claim:

1. A nuclear boiler comprising a vessel having a top closed by a dismountable cover, a cage bearing the core of the reactor and separating the vessel into an inner hot zone and an outer cold zone, at least one steam generator disposed outside the vessel and comprising a tight enclosure, a tube plate separating the enclosure into a primary part, or water box, and a secondary part, and bearing U-shaped tubes whose ends open into two concentric zones of the water box separated by an internal structure, at least one hot connecting pipe and one cold connecting pipe respectively connecting the hot zone and the cold zone of the vessel to each of the concentric zones of the water box, wherein the tube plate, the tubes and the secondary part of the enclosure of the steam generator define a sub-assembly dismountable from the primary part of the enclosure, the hot connecting pipe being dismountably mounted between the cage and the internal structure of the water box, said internal structure being dismountably mounted in the primary part of the enclosure.

2. The nuclear boiler of claim 1, wherein the hot connecting pipe is rectilinear and of a length shorter than the inner diameter of the vessel, so as to be able to be extracted through the latter after the cover has been dismantled and the core cage removed.

3. The nuclear boiler of claim 2, wherein the hot connecting pipe is hermetically fixed to the cage by dismountable fixing means and received by tight slide in an aperture formed in the internal structure of the water box.

4. The nuclear boiler of claim 3, wherein the dismountable fixing means comprise a key disposed transversely with respect to the hot connecting pipe and normally immobilised by the cover of the vessel.

5. The nuclear boiler of claim 1, wherein the primary and secondary parts of the enclosure of the steam generator bear flanges between which are disposed dismountable tightening means.

6. The nuclear boiler of claim 5, wherein the internal structure of the water box comprises a flange gripped between the primary and secondary parts of the enclosure under the action of the dismountable tightening means.

7. The nuclear boiler of claim 6, wherein the internal structure of the water box comprises two concentric bowls connected by pins and defining concentric zones of the water box, the flange gripped between the primary and secondary parts of the closed enclosure being fast with the outer bowl.

8. The nuclear boiler of claim 6, wherein a pump is fixed beneath the primary part of the enclosure, means being provided between the pump and the internal structure of the water box to urge the flange towards the tube plate.

* * * * *